Sept. 10, 1940.   A. J. HENDERSON ET AL   2,214,330
TANK AND THE LIKE FOR CARRYING INFLAMMABLE SPIRIT ON
AIRCRAFT, SHIPS, VEHICLES, AND THE LIKE
Filed Jan. 31, 1939
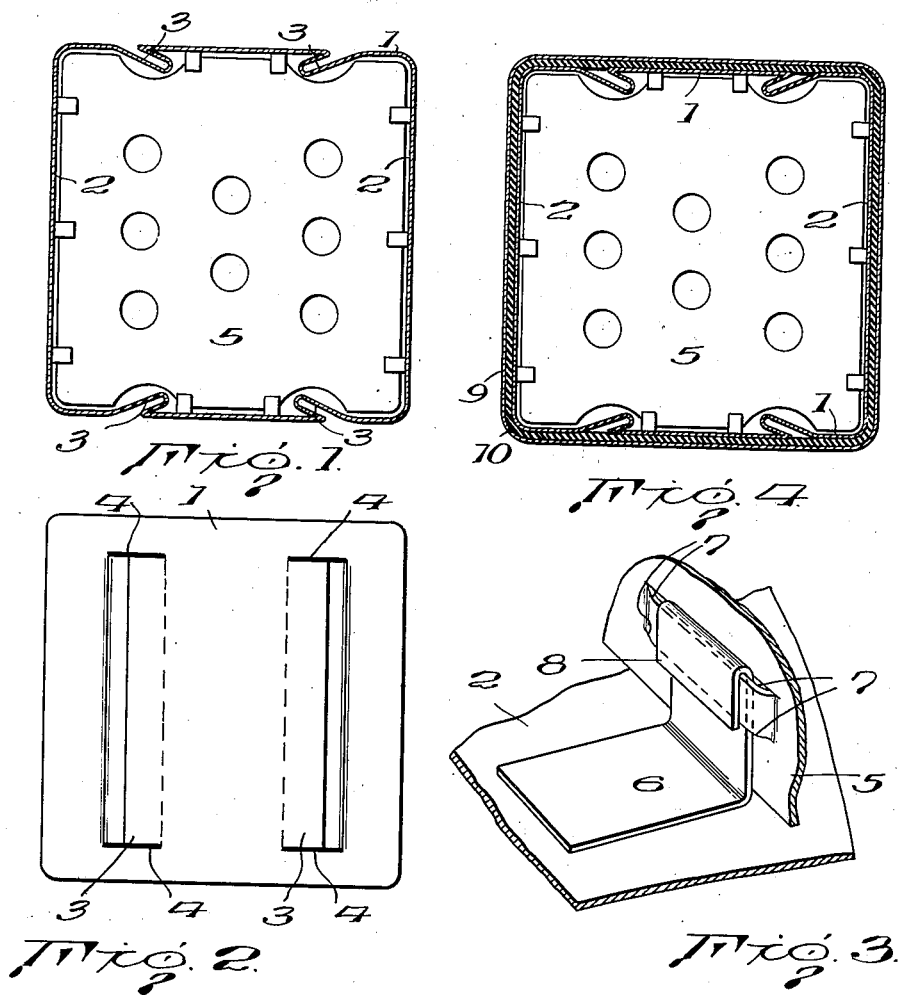
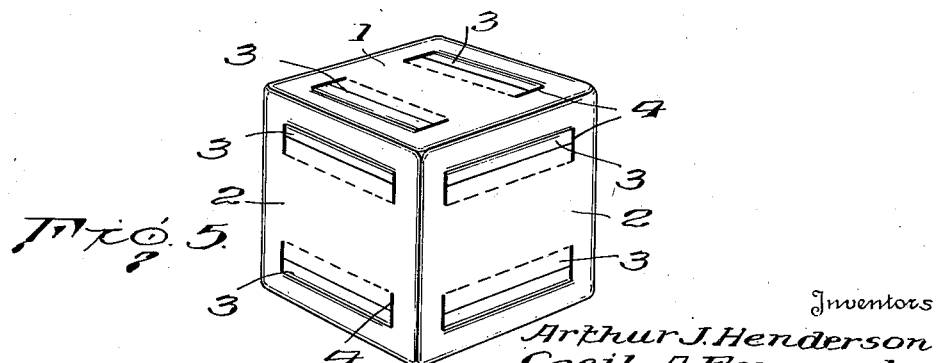
Inventors
Arthur J. Henderson
Cecil A. Forecast
Arthur J. B. Coates
By *[signature]*
Attorneys

UNITED STATES PATENT OFFICE 2,214,330

TANK AND THE LIKE FOR CARRYING INFLAMMABLE SPIRIT ON AIRCRAFT, SHIPS, VEHICLES, AND THE LIKE

Arthur James Henderson, Hove, Cecil Arthur Forecast, London, and Arthur James Berry Coates, Radlett, Hertfordshire, England Application January 31, 1939, Serial No. 253,740
In Great Britain January 19, 1938

8 Claims. (Cl. 220—83)

This invention is concerned with improvements in tanks or containers for holding liquids such as those adapted for use as fuel tanks for carrying inflammable liquid fuels on aircraft, ships, vehicles and the like.

Tanks for use in carrying inflammable liquid on aircraft must of necessity be of a light construction but at the same time they must possess sufficient strength and rigidity to prevent as far as possible risk of fracture or puncture in the event of the aircraft crashing or the tank being struck.

A tank in accordance with the present invention is formed from thin sheet metal the sides and/or the ends of the tank being formed with one or more pleats or overlapping folded portions which do not extend to the edges but terminate short of the full width of the sides or ends so that the metal is only of single thickness at the edges. These pleats provide on the one hand for free expansion of the tank in the event of impact avoiding fracture of the metal under the air pressure in the tank while the single thickness of metal at the edges permits the ends of the tank to crush in the event of impact. Where the pleats terminate the thicknesses of folded metal will be soft soldered. Where a pair or pairs of pleats is or are provided on a side or end the folded portions of the metal of each pair will face one another to provide for easier expansion.

In accordance with a further feature of the invention the tank is provided with a baffle or baffles adapted to be released readily on impact in order to allow the walls to expand freely and thus minimize the risk of fracture.

The baffle or baffles which may be arranged vertically or horizontally within the tank are loosely anchored preferably by means of angle pieces attached to the walls of the tank, the angle pieces passing through slots in the baffles. On impact, due to deformation of the tank, the angle pieces are withdrawn from the slots in the baffles which are thus released and are free to drop within the tank. Where such baffles are provided in tanks made of aluminium the angle pieces may be rivetted or otherwise secured to the walls of the tank. Where, however, the tank is made, for example, of copper, which may be tinned on the inside, the angle pieces can be soldered to the walls.

The tank above described may constitute the inner shell of a tank between which and an outer shell also composed of thin metal may be interposed a structurally continuous core composed of a light rubber compound which is vulcanized both to the inner and outer members.

Any necessary joints in the inner and outer metal members and the fittings or attachments on the tank are soft soldered in lieu of being riveted.

A construction of tank in accordance with the present invention is exceedingly light due to the thin metal members employed. The tank can be manufactured to any desired shape.

The invention is illustrated in the accompanying drawing in which Fig. 1 is a cross-section through a tank constructed in accordance with the present invention; Fig. 2 is a plan view of the tank; Fig. 3 a detail showing a preferred method of attaching baffles to the tank; Fig. 4 is a cross-section showing a tank constructed in accordance with a second embodiment of the invention, while Fig. 5 is a perspective view of one form of completed tank.

Referring now to Figs. 1, 2, 3 and 5 of the drawing, the tank comprises end walls 1 and side walls 2 of thin sheet metal, the end walls 1 (in Figs. 1 and 2) and the end walls 1 and the side walls 2 (in Fig. 5) each being formed with a pair of pleats or overlapping folded portions 3, the edges of the pleats being soft soldered at 4. These pleats or overlapping folded portions do not extend to the edges but terminate short of the full width of the sides or ends so that the metal is only of single thickness at the edges. These overlapping folded portions provide on the one hand for free expansion of the tank in the event of impact avoiding fracture of the metal under the air pressure in the tank while the single thickness of metal at the edges permits the ends of the tank to crush in the event of impact.

The tank is provided internally with one or more baffles 5. The baffles are secured within the tank by means of L-shaped angle members 6 attached to the walls of the tank one of which is shown in Fig. 3, one limb of each member 6 passing through a pair of slits 7 in the baffle 5, the metal between the slits being elevated from the adjacent metal to provide a free passage for the limb of the L-shaped angle members. The end of the angle member 6 after passing through the slits 7 can be bent over as indicated by the reference numeral 8 in order to anchor the baffle lightly to the angle member 6.

In the embodiment shown in Fig. 4 the tank as described with reference to Figs. 1, 2 and 3 constitutes the inner shell between which and an outer shell 9 of thin sheet metal is interposed a structurally continuous core 10 composed of a light rubber compound which is vulcanized both to the inner and outer shells.

We claim:

1. A tank or container for inflammable liquids having walls of thin metal, at least one of said walls having a section which is folded upon itself in spaced relation throughout the fold to provide a portion expansible outwardly under internal pressure more readily than other portions of the wall, said folded portion being of substantial length and terminating at each end short of the edges of said wall.

2. A tank or container for inflammable liquids having walls of thin metal, at least one of said walls having a pair of spaced substantially parallel sections, each of which is folded upon itself to provide a portion expansible outwardly under internal pressure more readily than other portions of the wall, each of said folded portions being of substantial length and terminating at each end short of the edges of said wall.

3. A tank or container for inflammable liquids having walls of thin metal, at least one pair of opposite walls having sections which are folded upon themselves in spaced relation throughout the fold to provide portions expansible outwardly under internal pressure more readily than other portions of said walls, each of said folded portions being of substantial length and terminating at each end short of the edges of said wall.

4. A tank or container for inflammable liquids as set forth in claim 1, in which the fold formed in one wall of the tank is soft-soldered together.

5. A tank or container for inflammable liquids having walls of thin metal, at least one of said walls having a section which is folded upon itself to provide a portion expansible outwardly under internal pressure more readily than other portions of the wall, said folded portion being of substantial length and terminating at each end short of the edges of said wall, a baffle extending crosswise of the tank and said folded portion, and means for anchoring said baffle to the side walls of the tank, said anchoring means being readily releasable on impact of the tank.

6. A tank or container for inflammable liquids having walls of thin metal, at least one of said walls having a pair of spaced substantially parallel sections, each of which is folded upon itself to provide a portion expansible outwardly under internal pressure more readily than other portions of the wall, each of said folded portions being of substantial length and terminating at each end short of the edges of said wall, a baffle extending cross-wise of the tank and said folded portions, and means for anchoring said baffle to said side walls of the tank, said anchoring means being readily releasable on impact of the tank and comprising angle members attached to the walls of the tank and extending through openings formed in said baffle.

7. A tank or container for inflammable liquids having walls of thin metal, at least one of said walls having a section which is folded upon itself to provide a portion expansible outwardly under internal pressure more readily than other portions of the wall, said folded portion being of substantial length and terminating at each end short of the edges of said wall, an outer shell of sheet material spaced from said walls, and a structurally continuous and solid core of a rubber compound vulcanized and adhering to said walls and said shell and filling the space between them as a solid mass.

8. A tank or container for inflammable liquids having walls of thin metal, at least one of said walls having a pair of spaced substantially parallel sections, each of which is folded upon itself to provide a portion expansible outwardly under internal pressure more readily than other portion of the wall, each of said folded portions being of substantial length and terminating at each end short of the edges of said wall, an outer shell of sheet material spaced from said walls, and a structurally continuous and solid core of a rubber compound vulcanized and adhering to said walls and said shell and filling the space between them as a solid mass.

ARTHUR JAMES HENDERSON.
CECIL ARTHUR FORECAST.
ARTHUR JAMES BERRY COATES.